United States Patent [19]
Stanaland

[11] Patent Number: 5,154,137
[45] Date of Patent: Oct. 13, 1992

[54] WHELPING BOX

[76] Inventor: Arch E. Stanaland, P.O. Box 756, Tenaha, Tex. 75974

[21] Appl. No.: 760,985

[22] Filed: Sep. 17, 1991

[51] Int. Cl.⁵ .............................................. A01K 1/02
[52] U.S. Cl. ........................................ 119/19; 119/15
[58] Field of Search ................. 119/15, 19, 20, 165, 119/45.1, 28.5; 220/470, 408; 217/7, 42; 229/120.1, 199

[56] References Cited

U.S. PATENT DOCUMENTS

| | | |
|---|---|---|
| 2,331,866 | 10/1943 | Grogan . |
| 2,552,007 | 5/1951 | Griffith . |
| 2,741,223 | 4/1956 | Winborn, Jr. ............... 119/165 |
| 3,490,417 | 1/1970 | Swinney . |
| 3,990,397 | 11/1976 | Lowe, Jr. ..................... 119/165 |
| 4,111,157 | 9/1978 | Haugen ......................... 119/19 |
| 4,161,157 | 7/1979 | Haugen ........................ 119/165 |
| 4,696,257 | 9/1987 | Neary et al. ............... 119/19 X |
| 4,996,944 | 3/1991 | Zook et al. .................... 119/20 |

Primary Examiner—Gene Mancene
Assistant Examiner—Thomas Price
Attorney, Agent, or Firm—Fleit, Jacobson, Cohn, Price, Holman & Stern

[57] ABSTRACT

A whelping box that fits inside of a dog crate or kennel in order to prevent a mother dog from lying down on her very young puppies which can result in death of the puppies from being crushed or smothered. The whelping box is a tray-like structure which has an outwardly extending peripheral flange attached to the interior of an existing crate by the use of existing fastener bolts which secure the top and bottom half of existing crates together. The whelping box is constructed of a one piece molded plastic material that is stackable and positionable in the bottom half of an existing crate and includes an inwardly projecting peripheral flange spaced upwardly from the bottom edge of the tray-like insert and spaced upwardly from the bottom of an existing dog crate to provide a peripheral protected space for young puppies to prevent the mother dog from lying down on the puppies.

3 Claims, 1 Drawing Sheet

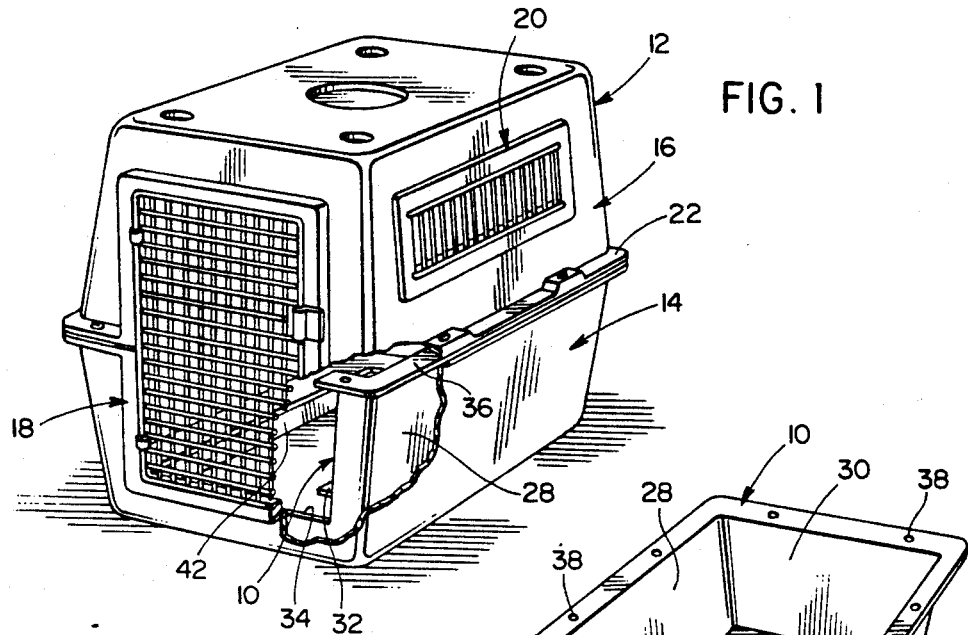
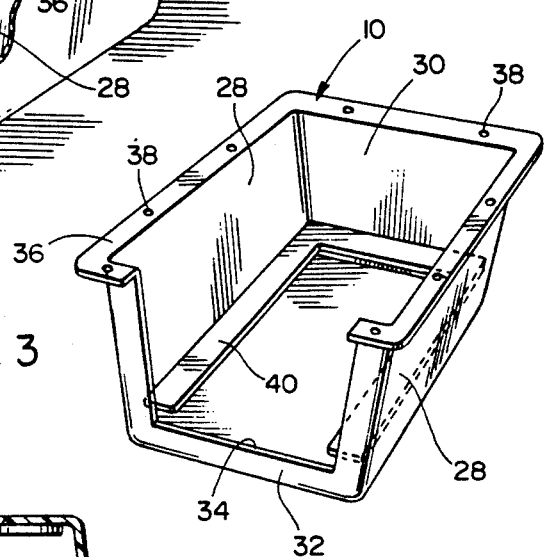
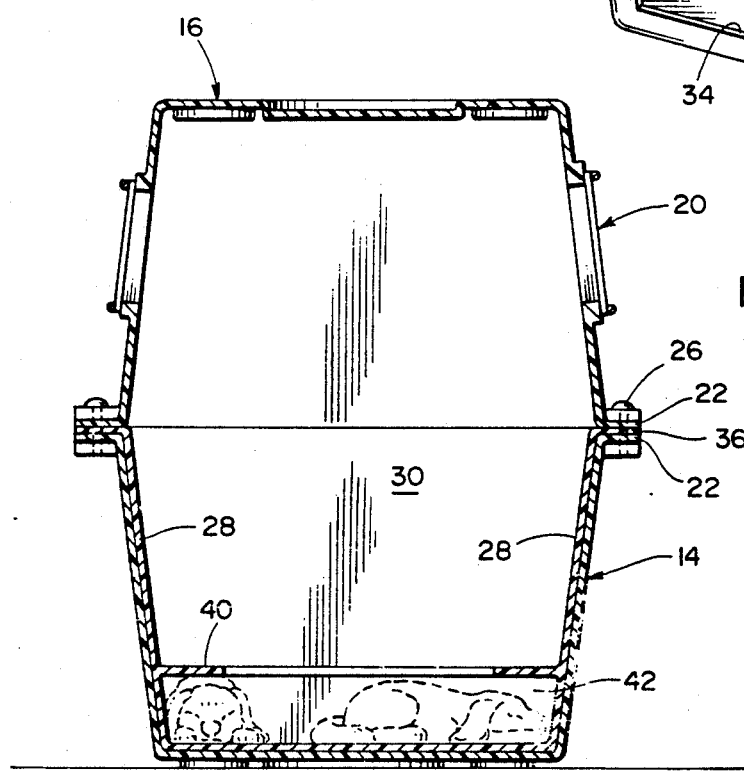
FIG. 1
FIG. 3
FIG. 2

WHELPING BOX

BACKGROUND OF THE INVENTION

1. Field of the Invention

The present invention generally relates to a whelping box and more particularly a whelping box that fits inside of a dog crate or kennel in order to prevent a mother dog from lying down on her very young puppies which can result in death of the puppies from being crushed or smothered. The whelping box is a tray-like structure which has an outwardly extending peripheral flange attached to the interior of an existing crate by the use of existing fastener bolts which secure the top and bottom half of existing crates together. The whelping box is constructed of a one piece molded plastic material that is stackable and positionable in the bottom half of an existing crate and includes an inwardly projecting peripheral flange spaced upwardly from the bottom edge of the tray-like insert and spaced upwardly from the bottom of an existing dog crate to provide a peripheral protected space for young puppies to prevent the mother dog from lying down on the puppies.

2. Description of the Prior Art

An ongoing problem encountered when mother dogs give birth to puppies or whelps and are located in a confined area such as a dog crate or kennel is the relatively high incidence of the mother dog accidentally killing one or more very young puppies by the mother dog lying down on and completely covering the young puppies. Various efforts have been made to provide devices to alleviate this problem including the use of some type structure to protect the puppies or whelps during the period in which they are vulnerable to this type of accidental death. U.S. Pat. Nos. 2,331,866, 2,552,007 and 3,490,417 relate to this invention.

U.S. Pat. No. 3,490,417 discloses one arrangement in which a structure has been incorporated into a dog crate or kennel in an effort to alleviate the problem.

None of the prior patents discloses a structure equivalent to the above invention which includes a one piece molded insert that fits the entire bottom of a dog crate or kennel and which provides a safety rail or shelf in the form of a continuous flange which provides a structure to prevent the mother animal from lying on or pushing the puppies against the sides of the crate. This invention is capable of being secured in place within the dog crate by the same bolts which hold the two halves of the dog crate together thus enabling the invention to be easily removed for cleaning. The present invention does not affect operation of the crate with the existing door or doors on the crate being closed to prevent the mother animal from removing the puppies from the crate and the tray-like structure of this invention can be easily stacked for shipment and storage and may be stacked along with the crate top and bottom halves for easy shipping and storage and can be used as a free standing bed or as a free standing whelping bed outside of an existing crate or kennel.

SUMMARY OF THE INVENTION

An object of the present invention is to provide a whelping box to prevent a mother dog from lying on and causing injury or death to her very young puppies or whelps.

Another object of the invention is to provide a whelping box in the form of a one piece, molded tray-like structure having an inwardly extending peripheral flange disposed above the bottom edge of the tray-like structure to provide a protected space for receiving whelps to prevent a mother dog from lying on her whelps and possibly causing injury or death.

A further object of the invention is to provide a whelping box in accordance with the preceding objects in which the tray-like structure is provided with a partially open front and a peripheral outwardly extending flange at the upper edge to enable the tray-like structure to be nested and stacked for transit and storage and enabling the tray-like structure to be inserted into existing dog crates or kennels by attaching the outwardly extending flange at the upper edge thereof between the flanges on the lower and upper half of a two piece dog crate or kennel with the tray-like structures being stacked and nested with respect to the upper and lower halves of the dog crate for transit and storage.

Still another object of the invention is to provide a whelping box in accordance with the preceding objects in which the whelping box can be used as free standing bed or free standing whelping bed.

Yet another object of the invention is provide a whelping box in accordance with the preceding objects which is easily cleaned by being constructed of plastic, metal or similar material which can be easily molded into a final shape which can be easily assembled with respect to a dog crate or kennel or easily removed therefrom for cleaning.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a dog crate or kennel with portions broken away illustrating the orientation of a whelping box in relation to the dog crate.

FIG. 2 is a transverse, sectional view illustrating further structural details of the whelping box and its association with a dog crate.

FIG. 3 is a perspective of the whelping box illustrating its specific structure.

DESCRIPTION OF THE PREFERRED EMBODIMENTS

Referring now specifically to the drawings, the whelping box of the present invention is in the form of a tray-like structure generally designated by the reference numeral 10 and, as illustrated in FIGS. 1 and 2, the whelping box is associated with a conventional existing dog crate 12 which includes a bottom half 14 and a top half 16 provided with an entrance door 18 at one end thereof and ventilation openings 20. The whelping box is of conventional construction and the top and bottom halves may be of one piece molded construction each of which is provided with an outwardly extending flange 22 at the mating edges thereof which are secured together by conventional fastener bolts 26 all of which represents conventional dog crate structures with the top and bottom halves of the dog crate being nested or stacked for shipment and storage.

The whelping box 10 of the present invention is in the form of a tray-like structure having a pair of side walls 28, a solid end wall 30 and a front end wall 32 having an open area 34 therein aligned with a portion of the opening defined by the door 18 for the dog crate 12. The walls 28, 30 and 32 are all inclined downwardly and inwardly to conform with the inner surface of the lower half 14 of the dog crate 12 as illustrated in FIGS. 2 and 3 with the edges of the opening 34 also extending downwardly and inwardly in an inclined manner to conform with the edges of the opening defined by the openable door 18. The upper peripheral edge of the tray-like structure is provided with an outwardly extending flange 36 having openings 38 therein which match with and receive the bolts 26 securing the flanges 22 on the dog crate together when the whelping box 10 is combined with the dog crate 12. Thus, the flange 36 is positioned between the flanges 22 and the bolts 26 secure the whelping box in position within the dog crate with the whelping box generally defining a liner for the interior of the bottom half of the dog crate.

Positioned along the interior of the side walls 28 and end wall 30 is a flange 40 that is spaced upwardly from the bottom edge of the walls 28 and the end wall 30 with the flange 40 being continuous throughout the length of the walls 28 and end wall 30 to define a shelf-like support structure and defines a protected area 42 under the flange or shelf 40 to provide a space in which very young puppies or whelps can be protected from the mother dog lying down on the puppies or whelps as clearly illustrated in FIG. 2. Thus, by installing the tray-like structure 10 within the dog crate or kennel 12, the whelps will be protected from injury or death due to the mother dog lying on the whelps or young puppies.

The whelping box 10 can be used separate and apart from the dog crate or kennel 12 as a free standing bed or as a free standing whelping bed with the flange or shelf 40 still providing a substantial protected area 42 for the whelps. The provision of the relatively narrow flange 36 and the openings 38 enables the tray-like structure to be easily assembled with the two halves of the dog crate and also enable easy removal thereof for cleaning. The whelping box 10 can be nested and stacked with other identical whelping boxes and be nested and stacked with the halves of the dog crate for ease of transit and storage. The whelping box 10 does not alter the operation or function of the dog crate with the closure door 18 of the dog crate being operable as usual with the door being capable of being closed to prevent the mother animal from removing the whelps from the dog crate. As illustrated, the flange or shelf 40 provides an adequate height and width to the protected area 42 to protect the whelps or other small animals from the mother animal by preventing the adult animal from lying on the smaller animals. The one piece molded construction does not provide any small areas in which the small animals might catch their feet or toes and provides a space to enable the mother animals still to reach the small animal and enable the small animal to reach the mother animal to enable the small animal or whelp to suckle in a natural manner. When the mother animal lays down in the whelping box, the flange or lip 40 forming a shelf provides a protected area which enables the puppies to crawl under the flange and the mother dog will not lay on them and even if she lays down the mother dog cannot mash the puppies against the side of the whelping box.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A whelping box comprising a tray-like structure including a pair of elongated, transversely spaced side walls, a pair of end walls interconnecting said wide walls, one of said end walls including an open area enabling a mother animal to enter and leave the whelping box, and an inwardly extending peripheral flange on said side walls and the end wall remote from the end wall having the open area therein, said flange being spaced above a bottom portion of the side walls and end wall and extending inwardly to provide a protected area underlying the inwardly extending flange to accommodate and receive young animals to prevent a mother animal from lying down on and possibly causing injury or death to the young animals by crushing or smothering, said side walls and end walls being inclined downwardly and inwardly to enable additional whelping boxes to be nested and stacked on top of one another during transit and storage, said side walls and end walls including an outwardly extending narrow flange at an upper edge thereof with the open area in one end wall extending downwardly from said upper edge of the end wall to a point above a bottom portion thereof, said outwardly extending narrow flanges on the side walls and end walls being received between abutting flanges on a top and bottom half of a two-piece dog crate to enable the whelping box to be assembled into the bottom half of the dog crate to provide protective areas along each side and one end of the bottom half of the dog crate for young animals without interfering with an openable and closable door means in an opening in an end wall of the dog crate with the open area in said one end wall of the whelping box being aligned with the opening and door means in the bottom half of the dog crate, said narrow flanges including openings extending therethrough receiving assembly bolts for holding the top and bottom half of the dog crate together to enable the whelping box to be quickly and easily assembled with respect to a dog crate and removed therefrom for ease of cleaning.

2. In combination, a dog crate comprising side walls, end walls, a top wall and a bottom wall with the side walls and end walls including top and bottom halves joined together by peripheral mating flanges, an opening in one end wall of said crate, closable door means for said opening mounted on said one end wall fastener bolts securing the mating flanges on the top and bottom halves of the side walls and end walls of the dog crate together, a whelping box positioned in the dog crate and conforming generally with the shape and configuration of the bottom half of the side walls and end walls of the dog crate, said whelping box including a peripheral flange at an upper edge received between the mating flanges on the top and bottom halves of the side walls and end walls of the dog crate with the fastener bolts extending through said flanges to enable assembly and disassembly of the whelping box, said whelping box including side walls and end walls conforming with said side walls and end walls of the dog crate with one end wall of the whelping box including an open area aligned with said opening in the bottom half of said one end wall of the dog crate, and an inwardly extending flange extending continuously along the side walls and the end wall of said whelping box remote from the end wall having the open area to form a protected area in underlying relation to the inwardly extending flange, said inwardly extending flange being sufficiently wide to provide a protective area capable of receiving small animals to prevent a mother animal from lying down on the small animals.

3. In combination, a dog crate of generally rectangular configuration and including a top wall, a bottom wall, a pair of opposed end walls and a pair of opposed side walls, one of said end walls having an enlarged opening therein to permit entry and exit of a dog, an openable closure door mounted on said one wall for selectively closing said opening, a whelping box positioned in a bottom portion of said dog crate, said whelping box conforming generally with the shape and configuration of the bottom portion of the dog crate and including opposed end walls and opposed side walls of one-piece construction with the side walls and the end walls of the whelping box extending from the bottom wall of the dog crate upwardly and terminating at an upper end oriented substantially equidistant from the top wall and bottom wall of the dog crate, one end wall of said whelping box including an open area aligned with a bottom portion of the opening in said one end wall of the dog crate with the door forming a closure for the open area of the whelping box to selectively permit entry and exit of a dog into the whelping box, said side walls of the whelping box and the end wall of the whelping box opposite to the end wall of the whelping box having the open area therein being provided with a continuous, generally horizontally disposed, inwardly extending flange, said inwardly extending flange being spaced upwardly from the bottom wall of said dog crate to form a protected area in underlying relation to the inwardly extending flange with the inwardly extending flange being sufficiently wide to provide a protective area capable of receiving small pups to permit a mother dog from lying down on the small pups.

* * * * *